US007116810B2

(12) United States Patent
Miller et al.

(10) Patent No.: US 7,116,810 B2
(45) Date of Patent: Oct. 3, 2006

(54) METHOD AND SYSTEM FOR AIRWAY MEASUREMENT

(75) Inventors: James Vradenburg Miller, Clifton Park, NY (US); Matthew William Turek, Glenville, NY (US); Joseph Leagrand Mundy, Barrington, RI (US); Peter Henry Tu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 801 days.

(21) Appl. No.: 10/065,878

(22) Filed: Nov. 27, 2002

(65) Prior Publication Data

US 2004/0101182 A1 May 27, 2004

(51) Int. Cl.
*G06K 9/00* (2006.01)
*A61B 5/08* (2006.01)

(52) U.S. Cl. .................. 382/131; 382/128; 600/538

(58) Field of Classification Search ................ 382/128, 382/130–133; 600/407, 538, 587
See application file for complete search history.

(56) References Cited

U.S. PATENT DOCUMENTS 6,175,755 B1    1/2001  Hogg et al. ................. 600/407
6,549,649 B1*   4/2003  Penkethman ................ 382/151
7,058,210 B1*   6/2006  Mundy et al. ............... 382/128
2003/0144598 A1* 7/2003  Zhang et al. ................ 600/529

OTHER PUBLICATIONS

Miller et al. ("MUSE: Robust Surface Fitting using Unbiased Scale Estimates", IEEE 1996, pp. 300-306).*
Miller et al. ("Prediction Intervals for Surface Growing Range Segmentation", IEEE 1997, pp. 1027-1033).*

* cited by examiner

*Primary Examiner*—Duy M. Dang
(74) *Attorney, Agent, or Firm*—Jean K. Testa; Donald S. Ingraham

(57) ABSTRACT

A method for measuring tubular anatomical structures, for example lung airways, comprises isolating by at least one segmentation process a given tubular anatomical structure of interest and measuring at least one attribute of the structure of interest. A system for measuring lung airways using acquired image data is provided. The system comprises an imaging device for acquiring the image data and an image processing device coupled to the imaging device. The imaging processing device is configured for isolating by at least one segmentation process a given airway of interest, fitting an inner ellipse to an inner boundary of the given airway and an outer ellipse to an outer boundary of the airway structure using statistical techniques at a given point in the airway, and further configured for generating measurements of the given airway using the inner and outer ellipses.

12 Claims, 2 Drawing Sheets

METHOD AND SYSTEM FOR AIRWAY MEASUREMENT

BACKGROUND OF INVENTION

This invention relates to a method and system for processing medical image data to aid in the detection and diagnosis of disease, and more particularly, to a method and system for detecting lung disease in medical images obtained from a x-ray computed tomography (CT) system.

A x-ray chest radiograph system is the more commonly used diagnostic tool useful for the purpose of detecting lung disease in humans. Lung disease such as bronchitis, emphesema and lung cancer are also detectable in chest radiographs and CT. However, CT systems generally provide over 80 separate images for a single CT scan thereby providing a considerable amount of information to a radiologist for use in interpreting the images and detecting suspect regions that may indicate disease.

Suspect regions are defined as those regions a trained radiologist would recommend following through subsequent diagnostic imaging, biopsy, functional lung testing, or other methods. The considerable volume of data presented by a single CT scan presents a time-consuming process for radiologists. Conventional lung cancer screening generally involves a manual interpretation of the 80 or more images by the radiologist. Fatigue is therefore a significant factor affecting sensitivity and specificity of the human reading. In other diseases, such as emphysema, it is difficult for a radiologist to classify the extent of disease progression by only looking at the CT images.

Chronic Obstructive Pulmonary Disease (COPD) is identified based on symptoms including coughing, wheezing, and shortness of breath (dyspnea). COPD includes a number of respiratory diseases, the most prominent of which are emphysema and chronic bronchitis. COPD affects large airways, small airways and parenchyma in patients. Diseases are typically caused by smoking and air pollution, and are linked to genetic predisposition causing alpha-anti-elastase deficiency.

Emphysema, or airspace destruction, is the most prominent feature of parenchymal change in COPD patients. Emphysema is the result of the loss of elastic recoil of lung tissue. There are four types of emphysema: centrilobular, panlobular or panacinar, distal acinar or paraseptal, and irregular. The first two types contribute to the majority of emphysematous COPD. The classification is based on the anatomical distribution of airspace destruction within a lobule, which is a cluster of acini. Currently, emphysema can be classified only through post mortem examination. Emphysema is typically diagnosed by gross physiological responses, medical imaging and post mortem anatomical inspection.

Chronic bronchitis causes anatomical airway narrowing, which reduces lung function. Airway modification typically begins with irritation from smoking and/or air pollution and can be caused/exacerbated by biological infection. Chronic bronchitis is clinically defined by persistent cough and sputum production for more than 3 months in a 2-year period. Chronic bronchitis can be classified into simple chronic bronchitis, obstructive bronchitis and chronic asthmatic bronchitis. In simple chronic bronchitis, no sputum is produced. Chronic asthmatic bronchitis involves hyperreactivity of the airways. In obstructive chronic bronchitis, airflow is hindered by airway modification. Chronic bronchitis is currently staged using Reid index post mortem. High resolution CT may enable scoring chronic bronchitis using Reid index in vivo.

Bronchial wall cross-sectional area is a key indicator in the diagnosis and staging of COPD. Measuring airway cross-sectional area from medical images (for instance CT) will enable physicians to track disease progression and accelerate clinical trials. Bronchial passages appear in CT images as small dark regions surrounded by bright regions. The dark area is the lumen while the bright area is composed of both the bronchial wall and any attaching or adjacent blood vessels. In measuring the airway wall cross-sectional area, one must not incorporate the thickness of the attaching or adjacent blood vessels.

If the airway is isolated, with no attaching or adjacent blood vessels, the airway can be measured using a variety of standard image processing and computer vision techniques. When the imaged airway has attached of adjacent blood vessels, an example of traditional approach has been to manually select a ray from the center of the lumen that passes through the airway wall at a point where the are no blood vessels. The measure of the wall thickness along this single ray is used to estimate the airway cross-sectional area.

What is needed is a robust method and system for measuring airways to enable diagnosis and tracking of various diseases of COPD.

SUMMARY OF INVENTION

In a first aspect, a method for measuring tubular anatomical structures, for example lung airways, is provided and comprises isolating by at least one segmentation process a given tubular structures of interest and measuring at least one attribute of the structure of interest.

In a second aspect, a system for measuring lung airways using acquired image data is provided. The system comprises an imaging device for acquiring the image data and an image processing device coupled to the imaging device. The imaging processing device is configured for isolating by at least one segmentation process a given airway of interest, fitting an inner ellipse to an inner boundary of the given airway and an outer ellipse to an outer boundary of the airway structure using statistical techniques at a given point in the airway, and further configured for generating measurements of the given airway using the inner and outer ellipses.

BRIEF DESCRIPTION OF DRAWINGS

The features and advantages of the present invention will become apparent from the following detailed description of the invention when read with the accompanying drawings in which.

DETAILED DESCRIPTION

Figure 1:
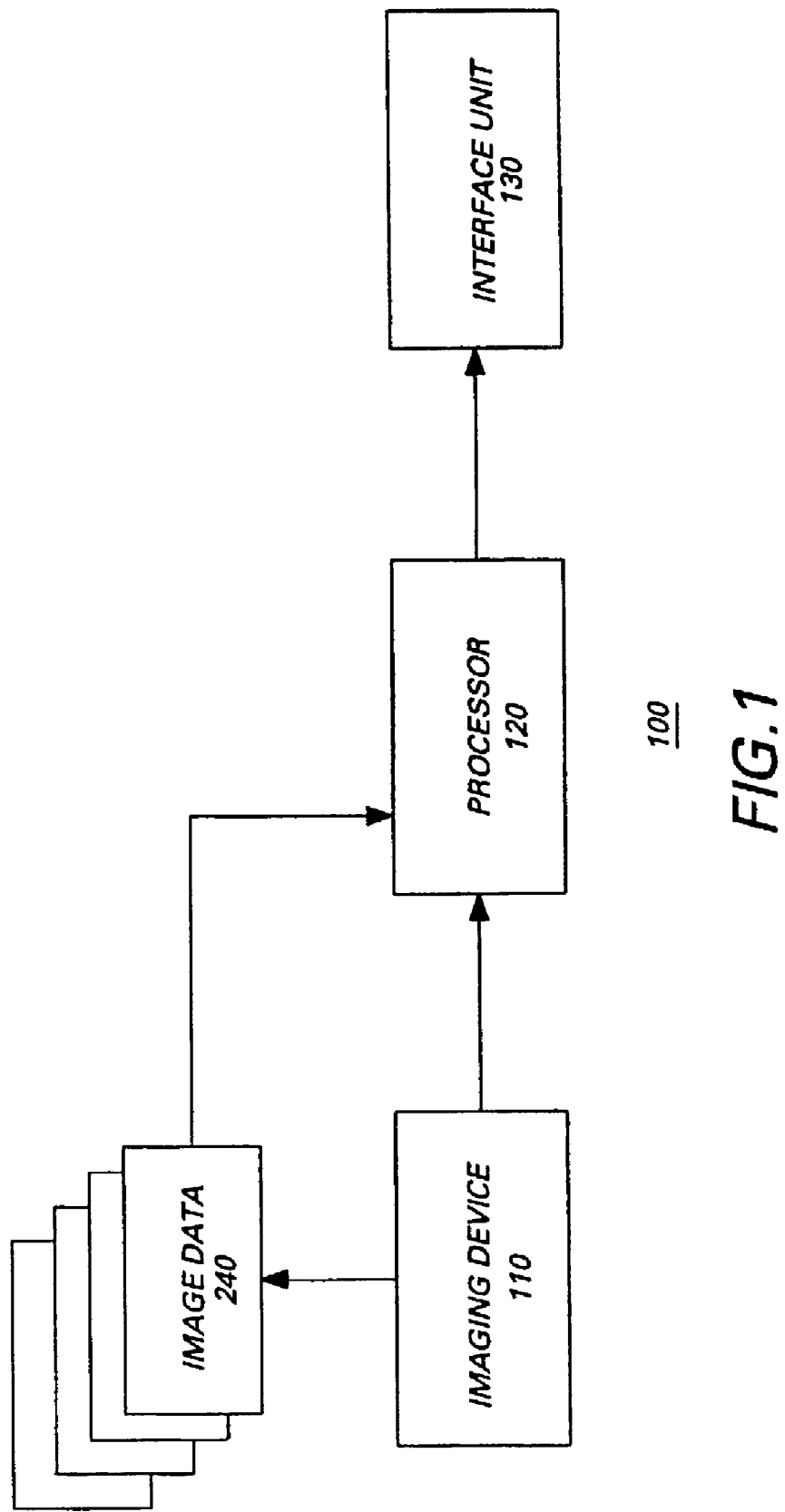
FIG. 1 is a block diagram illustration of a medical imaging system for which embodiments of the present invention are applicable; and, FIG. 2 is a block diagram and exemplary illustrations of methods employing the present invention.

Referring to FIG. 1, a general block diagram of a system 100 for disease detection is shown. System 100 includes an imaging device 110, which can be selected from a number of medical imaging devices known in the art for generating a plurality of images. Most commonly, computed tomography (CT) and magnetic resonance imaging (MRI) systems are used to generate a plurality of medical images.

During a CT imaging session, a patient is placed within the imaging device and is exposed to a plurality of x-rays measured with a series of X-ray detectors. A beam of x-rays passes through a particular thin cross-section or "slice" of the patient. The detectors measure the amount of transmitted radiation. This information is used to compute the x-ray attention coefficient for sample points in the body. A gray scale image is then constructed based upon the calculated x-ray attenuation coefficients. The shades of gray in the image represent the amount of x-ray absorption of every point within the slice. The slices obtained during a CT session can be reconstructed to provide an anatomically correct representation of the area of interest within the body that has been exposed to the x-rays.

During a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. Like CT image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

Once initial MR or CT images have been obtained, the images are generally segmented. The segmentation process classifies the pixels or voxels of an image into a certain number of classes that are homogeneous with respect to some characteristic (i.e. intensity, texture, etc.). For example, in a segmented image of the brain, the material of the brain can be categorized into three classes: gray matter, white matter, and cerebrospinal fluid. Individual colors can be used to mark regions of each class after the segmentation has been completed. Once the segmented image is developed, surgeons can use the segmented images to plan surgical techniques.

Generally, creating a segmented CT or MR image involves several steps. A data set is created by capturing CT or MR slices of data. Through the segmentation process, a gray scale value is then assigned to each point in the data set. Each type of material in the data is assigned a specific value and, therefore, each occurrence of that material has the same gray scale value. For example, all occurrences of bone in a particular image may appear in a particular shade of light gray. This standard of coloring allows the individual viewing the image to easily understand the objects being represented in the images.

FIG. 1 illustrates a medical imaging system 100 to which embodiments of the invention are applicable. The system includes an imaging device 110, a processor 120 and an interface unit 130. Imaging device 110 is adapted to generate a plurality of image data sets 240 and is, for example, a computed tomography (CT) or magnetic resonance (MR) scanner. In the context of CT or MR, acquisition of image data is generally referred to as "scans". In an exemplary embodiment, the images are acquired using a CT imaging device. Processor 120 is configured to perform computations in accordance with embodiments of the present invention which will be described in greater detail with reference to FIG. 2. Processor 120 is also configured to perform computation and control functions for well-known image processing techniques such as reconstruction, image data memory storage, segmentation and the like. Processor 120 may comprise a central processing unit (CPU) such as a single integrated circuit, such as a microprocessor, or may comprise any suitable number of integrated circuit devices and/or circuit boards working in cooperation to accomplish the functions of a central processing unit. Processor 120 desirably includes memory. Memory within processor 120 may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 120 is also capable of executing the programs contained in memory and acting in response to those programs or other activities that may occur in the course of image acquisition and image viewing. As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Interface unit 130 is coupled to processor 120 and is adapted to allow human users to communicate with system 100. Processor 120 is further adapted to perform computations that are transmitted to interface unit 130 in a coherent manner such that a human user is capable of interpreting the transmitted information. Transmitted information may include images in 2D or 3D, color and gray scale images, and text messages regarding diagnosis and detection information. Interface unit 130 may be a personal computer, an image work station, a hand held image display unit or any convention image display platform generally grouped as part of a CT or MRI system.

All data gathered from multiple scans of the patient is to be considered one data set. Each data set can be broken up into smaller units, either pixels or voxels. When the data set is two-dimensional, the image is made up of units called pixels. A pixel is a point in two-dimensional space that can be referenced using two dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the image is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

As part of acquiring the image data, it is to be appreciated by one skilled in the art that appropriate patient scanning protocol is needed. For example, chest exams using CT or MRI typically require the patient (subject) to hold their breath to reduce motion artifacts in the image data due to patient respiration. Usually, CT or MRI exams are taken during full inspiration or full expiration. Further, contrast agents may be used to attenuate the x-ray radiation in particular areas of the body. Contrast agents help improve the differentiation between tissues which are affected by the contrast agents and tissues which are not affected. In the CT image, a CT number difference between contrasted and non-contrasted tissues will be larger than normal. Contrast agents are administered to the patient orally, intravenously or rectally.

Once image data is acquired from the imaging methods described above, image processor 120 is adapted to perform processing to measure bronchial wall cross-sectional areas in accordance with embodiments of the present invention which will now be described in greater detail below. As was described in the background, bronchial wall cross-sectional area is a key indicator in the diagnosis and staging of chronic obstructive pulmonary disease (COPD), particularly chronic bronchitis. Measuring the cross-sectional area of bronchial walls, or alternatively referred to as "airways", from medical images (e.g. CT image data) will enable physicians to track disease progression and accelerate clinical trials. Bronchial passages typically appear in CT images as small dark regions surrounded by bright regions. The dark area is the lumen while the bright area is composed of both the bronchial wall and any attaching or adjacent blood vessels. In measuring the airway wall cross-sectional area, it is necessary to isolate the airways from the attaching or adjacent blood vessels so that the thickness measurement does not incorporate such vessels.

In an embodiment of the present invention, a method for measuring a tubular structure is provided. As used herein, a tubular structure refers to any number of anatomical structures that can be described by a hollow (having an inner diameter and an outer diameter) and a circular or elliptical shape such as bronchial walls or airways. However, it is to be appreciated that measuring of other anatomical structures such as arteries or other major or significant blood vessels may also benefit from the measurement techniques described herein. Similarly, other non-anatomical tubular structures may also benefit from the measurement techniques in industrial or non-destructive testing environments. A method for measuring tubular anatomical structures from acquired image data comprises isolating by at least one segmentation process a given tubular anatomical structure of interest and measuring at least one attribute of the structure of interest.

Figure 2:
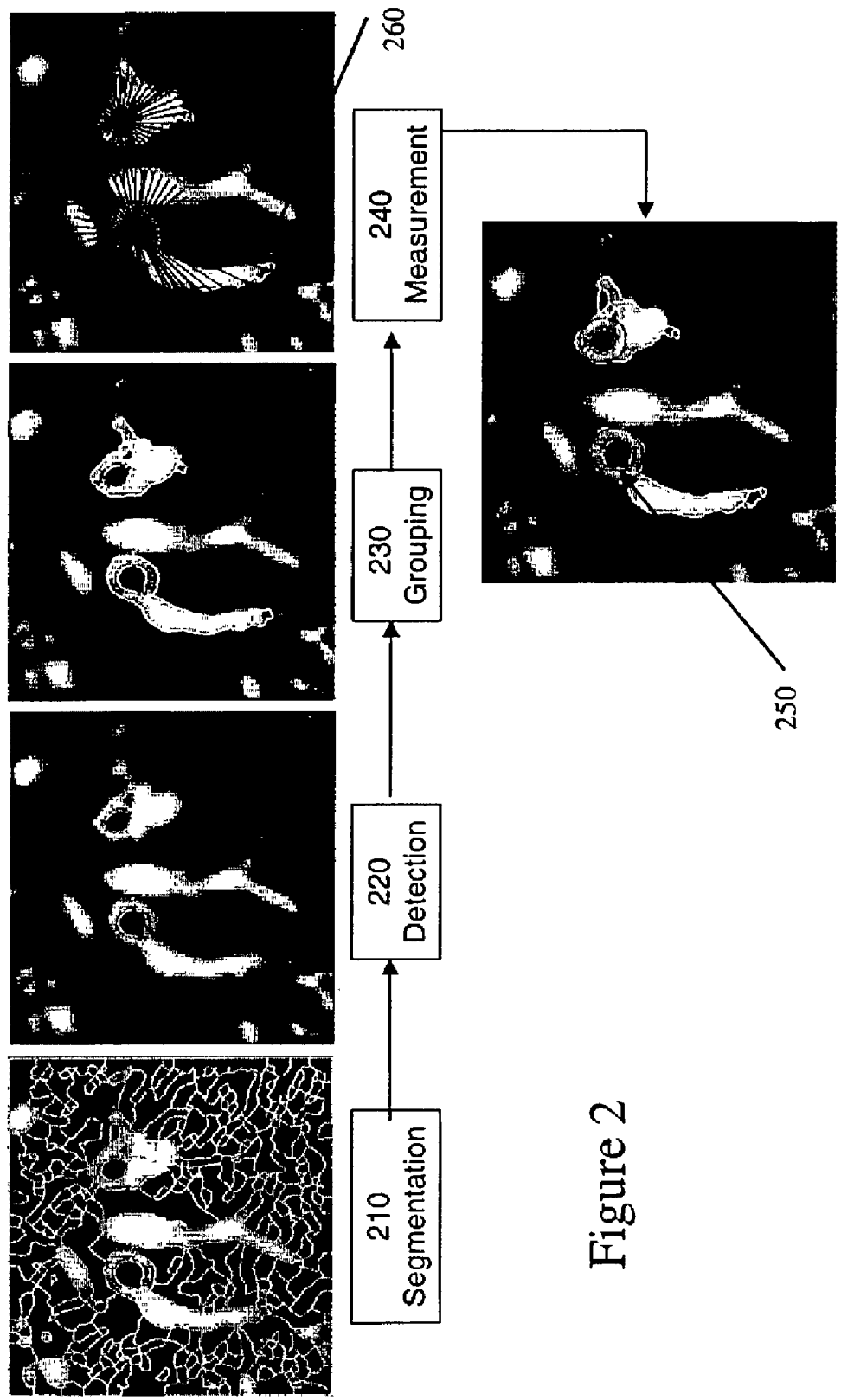

Referring to FIG. 2, the method for measuring the tubular anatomical structures comprises a first step of acquiring image data of the structure by the imaging devices and methods described above, for example CT or MRI. The image data is segmented into homogeneous regions shown in steps 210, 220 and 230 (210 segmentation by any of a variety of known techniques, 220 detecting similar structures by for example intensity values and 230 grouping like structures) and the airway lumens are detected. Measuring step 240 involves first identifying the center of the lumen 250. The center of the lumen can be identified without being biased by the presence of blood vessels.

In this embodiment, locating the center of the lumen is now described. First, the process fits an inner ellipse to an inner boundary of the lumen and fits an outer ellipse to an outer boundary of the lumen at several points along the airway. Later, the ellipse measurements used to measure attributes of the tubular structure. The problem is posed as fitting two concentric ellipses constrained to have a center that matches the center of the lumen. The inner ellipse is fit using an M-estimator since the lumen boundary has few outliers along its boundary. The outlier ellipse is fit using a combination of a robust estimation technique called Muse, a known technique, and a series of M-estimators. Muse is used to fit a circle to the exterior boundary of the airway. This provides a robust estimate of the minor axis of the outer airway boundary and a robust estimate of the noise in the positions of the outer boundary. Along with these robust estimates, Muse labels each of the points along the outer boundary as being inliers to the outer airway boundary or being outliers to airway boundary (for instance blood vessels). The inliers to the Muse circle are then fit with an ellipse using an M-estimator. The M-estimator is seeded with the Muse circle and Muse estimate of the scale (noise). The M-estimator is used calculate the parameters of the ellipse but is not used to calculate a new estimate of the scale (noise). Once the M-estimator converges, a new set of inliers to the ellipse is calculated from the original set of boundary points (not just the inliers to the Muse circle) using the Muse scale as a distance criterion. An M-estimator is then given this new set of inliers and is seeded with the previous ellipse parameters and the Muse scale estimate. This second M-estimator, re-estimates the ellipse but again does not re-estimate the scale. This process is repeated until the inlier set and the ellipse fit converges. By employing processing as described above, a robust method is provided in which adjacent blood vessels are not incorporated in the airway measurements.

Treating the lumen center point as invariant reduced the ellipse fitting problem from 6 parameters to 4. Here the data is centered such that the lumen center is the origin and the positional parameters of the ellipse do not need to be estimated. The lumen detection stage identifies dark regions that are completely surrounded by bright regions. The center of the bright region is calculated and rays 260 are cast from the center of the lumen. The rays are distributed such that they intersect the lumen boundary (inner wall) at a fixed interval or arc length. For each ray, two intersections are recorded: the intersection with the lumen boundary (inner wall), and the intersection with the airway (outer wall). The latter intersection points could be on the airway wall or they could be on adjacent vessels. These two sets of intersection points are then used to fit ellipses. The data is scaled to fit within the unit square (−1, 1) to improve numerical stability. Muse is used to robustly estimate the minor axis of an ellipse for the outer airway boundary (radius of the Muse circle) and robustly estimate the noise in the positions of the outer airway boundary. Muse also identifies an initial set of inliers (points belonging to the airway as opposed to points belong to blood vessels). Seeding an M-estimator with these inliers, Muse circle, and Muse scale (and not having the M-estimator estimate the scale) keeps the M-estimator from degrading to a least squares fit to the entire boundary (airway and blood vessels). Using Muse to only estimate a circle reduces the number of parameters to estimate 1. This greatly accelerates the estimation process. Iterative "corralling" an M-estimator in this fashion allows it to remain robust and fast. The process described above is performed iteratively.

Once the inner and outer boundaries are determined by the process described above, the wall thickness can be determined by taking the difference of the area between the airway boundary ellipse and the lumen boundary ellipse and is provided with subpixel accuracy. The wall thickness measurement can thereafter be used to calculate average wall thickness, wall thickness variations, volume measurements, two-dimensional (2D) area measurements and volume area distribution which are all relevant measurements for the purpose of diagnosing and tracking the progression of various diseases and stages of COPD. Further, the isolating and measuring steps are repeated for the image data corresponding to the length of the structure of interest in order to generate the measurements described above for the full length of the structure.

Once the processing described above is complete, the method may further comprise generating output of the level and progression of the disease. For example, the output may be used for staging the given disease in a patient, measuring response to therapy, phenotyping for patient selection to participate in drug trials, measuring stability of an anatomical structure and prediction of rate of change of the given disease. As used herein, phenotyping refers to observing physical or biochemical characteristics, as determined by both genetic makeup and environmental influences and to express a specific trait, such as stature or blood type, based on the influences. A phenotype is an individual or group of organisms exhibiting a particular phenotype.

In a further embodiment, a system for measuring lung airways using acquired image data is provided. The system comprises an imaging device for acquiring the image data and an image processing device coupled to the imaging device. The imaging processing device (120 of FIG. 1) is configured for isolating by at least one segmentation process a given airway of interest, fitting an inner ellipse to an inner boundary of the given airway and an outer ellipse to an outer boundary of the airway structure using statistical techniques at a given point in the airway, and further configured for generating measurements of the given airway using the inner and outer ellipses. The measurements comprise at least one of average wall thickness, wall thickness variations, volume measurements, two-dimensional (2D) area measurements and volume area distribution. The measurements are used for at least one of disease diagnosis and tracking of disease progression, and wherein the disease is chronic obstructive pulmonary disease or asthma. Desirably, the system includes display device (interface unit 130 of FIG. 1) coupled to the image processing device for reporting measurements to a system user.

The embodiments of the invention presented in previous paragraphs focus on the problem of locating suspicious regions in CT lung scans. It is to be appreciated that the measuring techniques can be directly transferred to other imaging modalities (for example MRI, X-ray, ultrasound scanner, positron emission tomography (PET) scanner) where measurement of substantially tubular anatomical structures is required to track or diagnosis a particular disease.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method for measuring lung airways from acquired image data comprising:
    isolating by at least one segmentation process a given airway of interest;
    fitting an inner ellipse to an inner boundary of the given airway and an outer ellipse to an outer boundary of the airway structure using statistical techniques at a given point in the airway; and,
    generating measurements of the given airway using the inner and outer ellipses.

2. The method of claim 1 wherein the at least one segmentation process comprises segmenting, detecting and grouping of homogeneous regions within the acquired image data.

3. The method of claim 1 wherein the measurements comprises at least one of average wall thickness, wall thickness variations, volume measurements, two-dimensional (2D)) area measurements and volume area distribution.

4. The method of claim 1 wherein the measurements are used for at least one of disease diagnosis and tracking of disease progression, and wherein the disease is chronic obstructive pulmonary disease.

5. The method of claim 1 wherein the steps of isolating, fitting and generating measurements are repeated for image data corresponding to a length of the given airway to generate measurements along the length of the given airway.

6. The method of claim 1 further comprising generating an output, wherein the output is used for at least one of staging the given disease in a patient, measuring response to therapy, phenotyping for patient selection to participate in drug trials, measuring stability of an anatomical structure and prediction of rate of change of the given disease.

7. A system for measuring lung airways using acquired image data comprising:
    an imaging device for acquiring the image data; and,
    an image processing device coupled to the imaging device and configured for isolating by at least one segmentation process a given airway of interest, fitting an inner ellipse to an inner boundary of the given airway and an outer ellipse to an outer boundary of the airway structure using statistical techniques at a given point in the airway, and further configured for generating measurements of the given airway using the inner and outer ellipses.

8. The system of claim 7 wherein the measurements comprises at least one of average wall thickness, wall thickness variations, volume measurements, two-dimensional (2D) area measurements and volume area distribution.

9. The system of claim 7 wherein the measurements are used for at least one of disease diagnosis and tracking of disease progression, and wherein the disease is at least one of chronic obstructive pulmonary disease and asthma.

10. The system of claim 7 further comprising a display device coupled to the image processing device for reporting measurements to a system user.

11. The system of claim 7 wherein the image processor is further adapted to generate an output and wherein the output is used for at least one of staging the given disease in a patient, measuring response to therapy, phenotyping for patient selection to participate in drug trials, measuring stability of an anatomical structure and prediction of rate of change of the given disease.

12. The system of claim 7 wherein the imaging device is at least one of a computed tomography (CT) device, a magnetic resonance imaging (MRI) device, a x-ray device, and an ultrasound device.

* * * * *